US008992090B1

(12) United States Patent
Mills

(10) Patent No.: US 8,992,090 B1
(45) Date of Patent: Mar. 31, 2015

(54) AIR DRAINED BEARING COMPARTMENT WITH OIL SHIELD

(71) Applicant: Jacob A Mills, Jupiter, FL (US)

(72) Inventor: Jacob A Mills, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 224 days.

(21) Appl. No.: 13/864,006

(22) Filed: Apr. 16, 2013

(51) Int. Cl.
F16C 33/66 (2006.01)
F01D 25/18 (2006.01)
F01D 25/16 (2006.01)

(52) U.S. Cl.
CPC ............. *F01D 25/18* (2013.01); *F01D 25/162* (2013.01); *F16C 33/6685* (2013.01)
USPC .......................................................... 384/473

(58) Field of Classification Search
CPC ................................................. F16C 33/6685
USPC ................................................. 384/473, 466
See application file for complete search history.

(56) References Cited

U.S. PATENT DOCUMENTS 3,773,396 A * 11/1973 Easley ........................ 384/472
6,996,968 B2 * 2/2006 Peters et al. ................. 60/39.08
7,699,530 B2 * 4/2010 Blais ............................ 384/462
8,292,510 B2 * 10/2012 Glahn et al. .................. 384/462
2012/0141270 A1 * 6/2012 Minadeo et al. .................. 416/1

* cited by examiner

*Primary Examiner* — Thomas R. Hannon
(74) *Attorney, Agent, or Firm* — John Ryznic

(57) ABSTRACT

A gravity drained bearing compartment with two oil shields that are located near to an air vent and an oil scavenge line, where the oil shields function to reduce circumferential momentum of the oil to prevent oil from entering the air vent and direct oil into the scavenge line.

4 Claims, 3 Drawing Sheets

AIR DRAINED BEARING COMPARTMENT WITH OIL SHIELD

GOVERNMENT LICENSE RIGHTS

This invention was made with Government support under contract number F33615-03-D-2357 awarded by the United States Air Force. The Government has certain rights in the invention.

Air drained bearing compartment with oil shield.

CROSS-REFERENCE TO RELATED APPLICATIONS

None.

BACKGROUND OF THE INVENTION

1. Field of the Invention

The present invention relates generally to a gas turbine engine, and more specifically to a gravity drained bearing compartment for a gas turbine engine.

2. Description of the Related Art including information disclosed under 37 CFR 1.97 and 1.98

In a gas turbine engine, a rotor shaft is supported by a bearing. A typical gas turbine engine rotor is supported by a forward bearing and an aft bearing. The bearings are supported within a bearing compartment that is drained by gravity. In a gravity drained bearing compartment, it is desirable to reduce the circumferential momentum of the air and oil mixture circulating within the bearing compartment. Separating the air from the oil encourages the majority of the oil to exit the bottom and the air to exit from the top of the bearing compartment. This separation of air and oil greatly reduces the pressure loss common with mixed phase flow. Avoiding this unsteady and high pressure loss associated with the mixed phase flow decreases the probability of flooding the bearing compartment with oil.

One prior art method of achieving this separation of air and oil is to include integral steps in the bearing compartment housing. This method takes up more space as well as makes the part more costly to manufacture.

BRIEF SUMMARY OF THE INVENTION

An oil sump shield for a gravity drained bearing compartment that blocks a circumferential flow of oil and air to separate the oil from the air. The bearing compartment includes an air vent on an upper side of the bearing compartment and an oil scavenge on a lower side. Two sump shields block the flow of the oil to separate the air and the oil so that the oil will not flow into the air vent and only the oil will flow into the scavenge vent and into the oil sump.

DETAILED DESCRIPTION OF THE INVENTION

Figure 1:
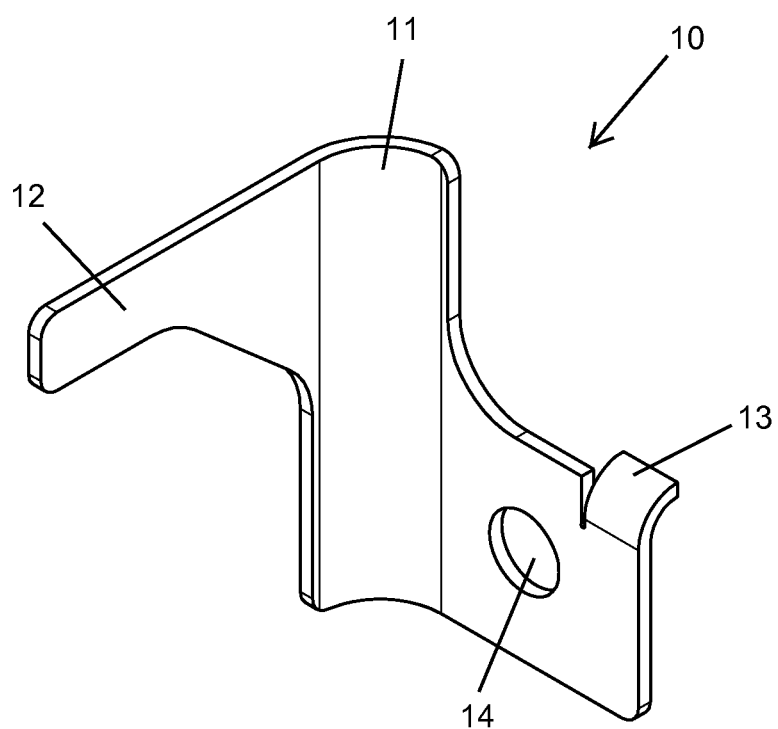
FIG. 1 shows an isometric view of an oil shield for a bearing compartment of the present invention.

The present invention is an attachable shield for a gravity drained bearing compartment that can be used in an industrial gas turbine engine, but can be used in any gravity drained bearing compartment. FIG. 1 shows the oil shield 10 of the present invention and includes a stiffener 11 to prevent HCF (High Cycle Fatigue) durability issues, a surface 12 to reduce circumferential momentum of the oil flow, an anti-rotation feature 13, and an attachment feature 14 to secure the oil shield within the bearing compartment.

Figure 2:
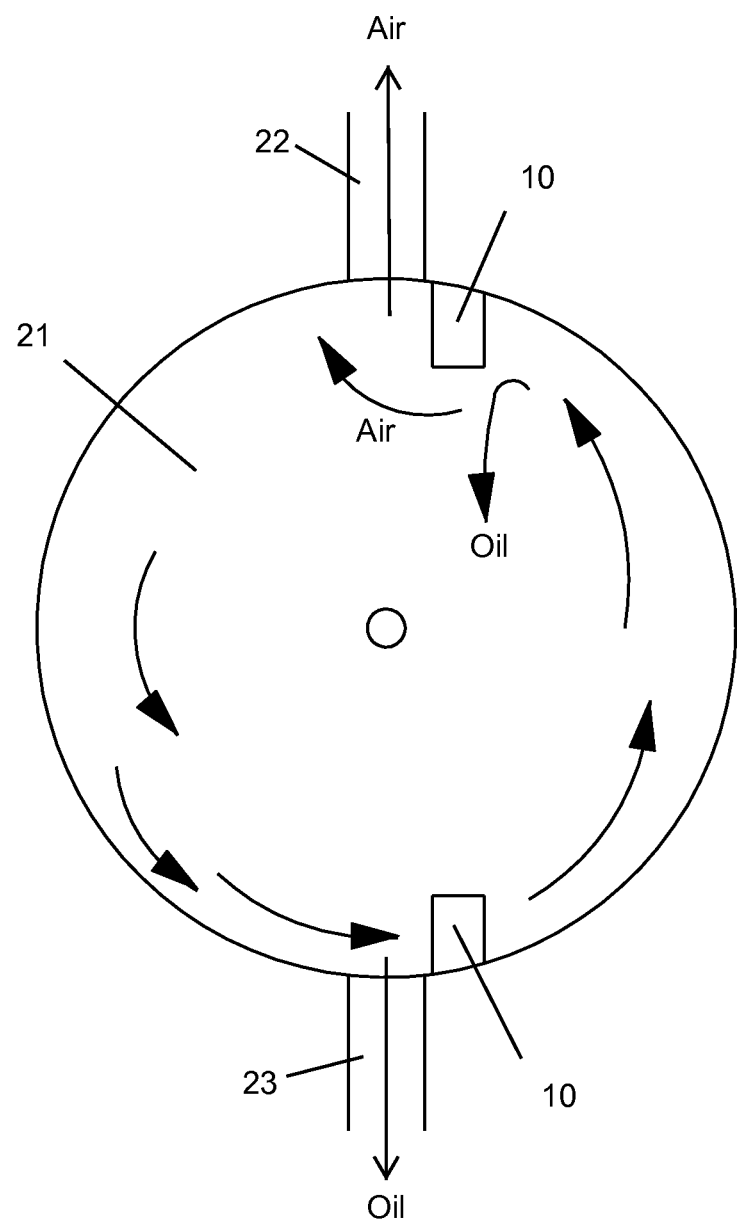
FIG. 2 shows a cross section front view of a gravity drained bearing compartment with two oil shields of the present invention.
Figure 3:
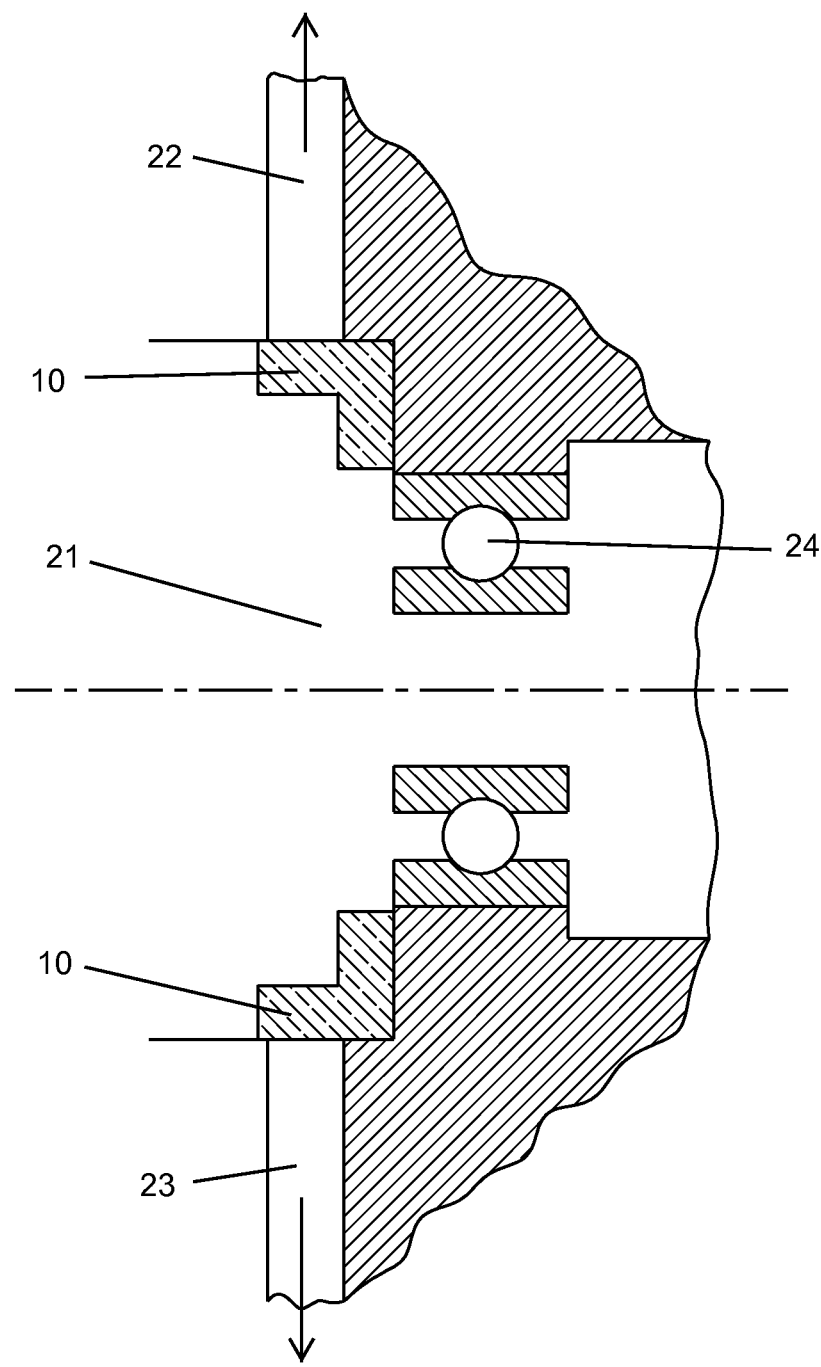
FIG. 3 shows a cross section side view of the gravity drained bearing compartment with two oil shields of the present invention.

FIG. 2 shows a side view of a gravity drained bearing compartment 21 with an air vent 22 for air and oil scavenge line 23 for oil. Two sump shields 10 are positioned within the bearing compartment with a first sump shield located upstream from the air vent 22 and a second sump shield located downstream from the oil scavenge line 23. The sump shields are located in these positions based on the circumferential momentum direction of the oil and air flows as represented in FIG. 2 by the arrows. As the air and oil flow toward the air vent on top of the bearing compartment 22, the top shield 10 will reduce circumferential momentum of the oil flow to separate the oil from the air so that the oil will not flow up into the air vent 22 but allow for the air to flow up into the air vent 22. The bottom oil shield 10 is located after the oil scavenge line 23 to reduce the circumferential momentum of the oil flow so that the oil will flow into the oil scavenge 23 without the air. FIG. 3 shows a side view of the bearing compartment 21 with the air vent 22 and the oil scavenge line 23 and the two sump shields 10 positioned in place. The bearing 24 is located to the side of the oil shields and air vent 22 and scavenge line 23.

The oil shield 10 has an L-shape cross section with a first surface 12 to reduce circumferential momentum of the oil flow and a second attachment surface at around 90 degrees from the first surface. The second attachment surface includes the anti-rotation feature 13 and a hole 14 for attaching the shield 10 to the bearing compartment. The first and second surfaces are joined by a stiffener 11 to prevent HCF durability issues. The first surface 12 to reduce circumferential momentum extends out into the circumferential flow path of the oil and air and blocks the flow to prevent the oil form flowing into the air vent and force the oil to flow into the oil scavenge line.

I claim the following:

1. A gravity drained bearing compartment comprising:
   a bearing compartment with a bearing;
   an air vent located in an upper half of the bearing compartment;
   an oil scavenge line located on a lower half of the bearing compartment;
   a first oil shield in the bearing compartment upstream from the air vent in a direction of circumferential flow of oil and air within the bearing compartment;
   a second oil shield in the bearing compartment downstream from the oil scavenge line in a direction of the circumferential flow of oil and air within the bearing compartment; and,
   the first and second oil shields function to prevent oil from flowing into the air vent and prevent air from flowing into the oil scavenge line.

2. The gravity drained bearing compartment of claim 1, and further comprising:
   each oil shield has an L cross sectional shape with a first surface that functions to reduce circumferential momentum of the oil and a second surface to attach the oil shield to the bearing compartment; and,
   a stiffener connecting the first surface to the second surface.

3. The gravity drained bearing compartment of claim 1, and further comprising:
   the stiffener is a curved shaped piece in cross section.

4. A method for operating a gravity drained bearing compartment, the bearing compartment having a bearing and an air vent in a top section and an oil scavenge line in a bottom section of the bearing compartment, the process comprising the steps of:

operating the bearing such that oil and air flow in a circumferential direction within the bearing compartment;

reducing the circumferential momentum of the oil in the upper section of the bearing compartment at a location upstream from the air vent to reduce the momentum of the oil such that mostly air flows into the air vent; and, reducing the circumferential momentum of the oil in the lower section of the bearing compartment at a location downstream from the oil scavenge line to reduce the momentum of the oil such that most of the oil flows into the oil scavenge line.

\* \* \* \* \*